(12) United States Patent
Glav et al.

(10) Patent No.: US 8,938,080 B2
(45) Date of Patent: Jan. 20, 2015

(54) METHOD AND A DEVICE FOR GENERATING ENGINE ACOUSTIC EMISSIONS, A COMPUTER PROGRAM AND A COMPUTER PROGRAM PRODUCT

(75) Inventors: Ragnar Glav, Vallentuna (SE); Manfred Klopotek Von Glowczewski, Nykvarn (SE); Adam Wikström, Bastuträsk (SE); Ola Jönsson, Huddinge (SE); Bror Tingvall, Luleå (SE); Roger Johnsson, Luleå (SE)

(73) Assignee: Scania CV AB (SE)

( * ) Notice: Subject to any disclaimer, the term of this patent is extended or adjusted under 35 U.S.C. 154(b) by 334 days.

(21) Appl. No.: 13/390,422

(22) PCT Filed: Aug. 11, 2010

(86) PCT No.: PCT/SE2010/050881
§ 371 (c)(1),
(2), (4) Date: Feb. 29, 2012

(87) PCT Pub. No.: WO2011/021977
PCT Pub. Date: Feb. 24, 2011

(65) Prior Publication Data
US 2012/0155672 A1    Jun. 21, 2012

(30) Foreign Application Priority Data
Aug. 19, 2009    (SE) .................................... 0950592

(51) Int. Cl.
*H04B 1/00*    (2006.01)
*H04R 1/00*    (2006.01)
(Continued)

(52) U.S. Cl.
CPC .. *H04R 1/26* (2013.01); *G09B 9/00* (2013.01); *H04R 3/04* (2013.01); *H04R 2499/13* (2013.01)
USPC ............. 381/86; 381/302; 381/384; 381/386; 381/389; 381/394; 381/162; 381/375; 381/385; 381/391; 381/26

(58) Field of Classification Search
USPC ........... 381/86, 150, 152, 160–167, 170–182, 381/184–191, 300–310, 337–433
See application file for complete search history.

(56) References Cited

U.S. PATENT DOCUMENTS 5,237,617 A * 8/1993 Miller .............................. 381/61
7,203,321 B1   4/2007 Freymann et al.
(Continued)

FOREIGN PATENT DOCUMENTS

EP    1 020 835 A1    7/2000

OTHER PUBLICATIONS

International Search Report dated Dec. 8, 2010 issued in corresponding international application No. PCT/SE2010/050881.
(Continued)

*Primary Examiner* — Duc Nguyen
*Assistant Examiner* — Yogeshkumar Patel
(74) *Attorney, Agent, or Firm* — Ostrolenk Faber LLP (57) ABSTRACT

A method for generating engine acoustic emissions including the steps of providing a loudspeaker configuration (100) based upon the configuration of said engine, and feeding the said loudspeaker configuration (100) with signals for providing desired engine acoustic emission. Also a device, a computer program and a computer program product for performing the method.

26 Claims, 6 Drawing Sheets

(51) Int. Cl.
*H04R 5/02* (2006.01)
*H04R 31/00* (2006.01)
*H04R 1/26* (2006.01)
*G09B 9/00* (2006.01)
*H04R 3/04* (2006.01)

(56) References Cited

U.S. PATENT DOCUMENTS

2002/0071571 A1* 6/2002 Vanderveen et al. ........ 381/71.4
2005/0163330 A1* 7/2005 Beguet ............................ 381/92
2006/0285697 A1* 12/2006 Nishikawa et al. .......... 381/71.1
2010/0290635 A1* 11/2010 Shridhar et al. ............. 381/71.1

OTHER PUBLICATIONS

International Preliminary Report on Patentability dated Sep. 21, 2011 issued in corresponding international application No. PCT/SE2010/050881.

* cited by examiner

METHOD AND A DEVICE FOR GENERATING ENGINE ACOUSTIC EMISSIONS, A COMPUTER PROGRAM AND A COMPUTER PROGRAM PRODUCT

CROSS-REFERENCE TO RELATED APPLICATIONS

The present application is a 35 U.S.C. §§371 national phase conversion of PCT/SE2010/050881, filed Aug. 11, 2010, which claims priority of Swedish Application No. 0950592-6, filed Aug. 19, 2009, the contents of which are incorporated by reference herein. The PCT International Application was published in the English language.

BACKGROUND

1. Technical Field

The present invention relates to a method for producing acoustic emissions and a device for such production.

Also a computer program and a computer program product for these purposes is disclosed.

2. Prior Art

The engine of e.g. a vehicle, e.g. of a combustion engine of the vehicle, and primarily, a heavy vehicle, such as a truck or a bus, is a source of severe acoustic emissions, particularly noise, which includes external noise as well as internal noise inside the vehicle compartment. Considerable efforts and research are performed to decrease acoustic emissions from such engines.

Such efforts and research include inter alia the intensity and level of the sound, its frequency distribution, source analysis etc. Such efforts and research include both investigations regarding actual sound characteristics and the results of attempts to amend the sound characteristics, e.g. decreasing the sound emission, changing the frequency distribution, etc.

Further, an extremely complex phenomenon is determining how acoustic emissions from e.g. the engine is transmitted in and throughout the vehicle and, thus, is emitted from the vehicle. Normally, a complex empiric approach is used.

Still further, attempts are being performed to find theoretical models for calculating acoustic transmission in and from a vehicle structure.

Thus, according to what was previously known, the emission profile of an engine is detected by, primarily, a microphone configuration by means of which the acoustic emission in different directions etc may be detected. Amendments with respect to the acoustic emission profile is performed by means of so-called lead wrapping, which comprises wrapping various parts of the engine using comparatively thin lead plate portions in order to isolate desired portions in order to investigate how various portions of the engine affect the acoustic emission profile. Lead is easy to shape around desired portions of the engine and has excellent attenuation properties. However, such a covering technique is extremely time consuming so this technique is far from perfect, apart from the fact that lead has toxic properties.

This previously known technique is quite an ineffective tool when it comes to detailed investigations regarding acoustic emission generation, acoustic transmission in a vehicle body, generating basis for calculation models etc, and does not provide the necessary information.

An object of the present invention is, primarily, to provide a new and improved technique for generating engine acoustic emissions, obtaining information regarding acoustic transmission in a vehicle body, determining the influence of acoustic parameter values and variations, providing a basis for calculation models etc,

SUMMARY OF THE INVENTION

The invention concerns a method for generating engine acoustic emissions which includes the steps of providing a loudspeaker configuration based upon the configuration of the engine. It includes feeding the loudspeaker configuration with signals for providing desired engine acoustic emissions as well as a device, a computer program and a computer program product for performing the method.

BRIEF DESCRIPTION OF THE DRAWINGS

A better understanding of the present invention should be obtained by reading the following detailed description in conjunction with the accompanying drawings in which FIG. 1a schematically shows a first embodiment of a loudspeaker configuration according to the present invention seen in a perspective view towards the front end in an as installed state of a corresponding real engine, FIG. 1b schematically shows the loudspeaker configuration of FIG. 1a seen in a perspective view towards the rear end in an as installed state of a corresponding real engine, FIG. 1c schematically shows a loudspeaker unit seen towards the loudspeaker membrane, FIG. 1d schematically shows the loudspeaker unit of FIG. 1c seen from the left in FIG. 1c, FIG. 2 schematically shows a perspective view of a skeleton or support framework for a loudspeaker configuration according to FIGS. 1a and 1b, the skeleton being seen substantially as the loudspeaker configuration in FIG. 1b, FIG. 3a schematically shows the steps of a general embodiment of a method according the present invention, FIG. 3b schematically shows the steps of one embodiment of a method according to the present invention shown more in detail, FIG. 4 schematically shows a subsystem of a device according to one embodiment of a device according to the present invention, and FIG. 5 schematically illustrates an apparatus comprising a data processing device according to one embodiment according to the present invention.

DETAILED DESCRIPTION OF PREFERRED EMBODIMENTS

Figure 1A:
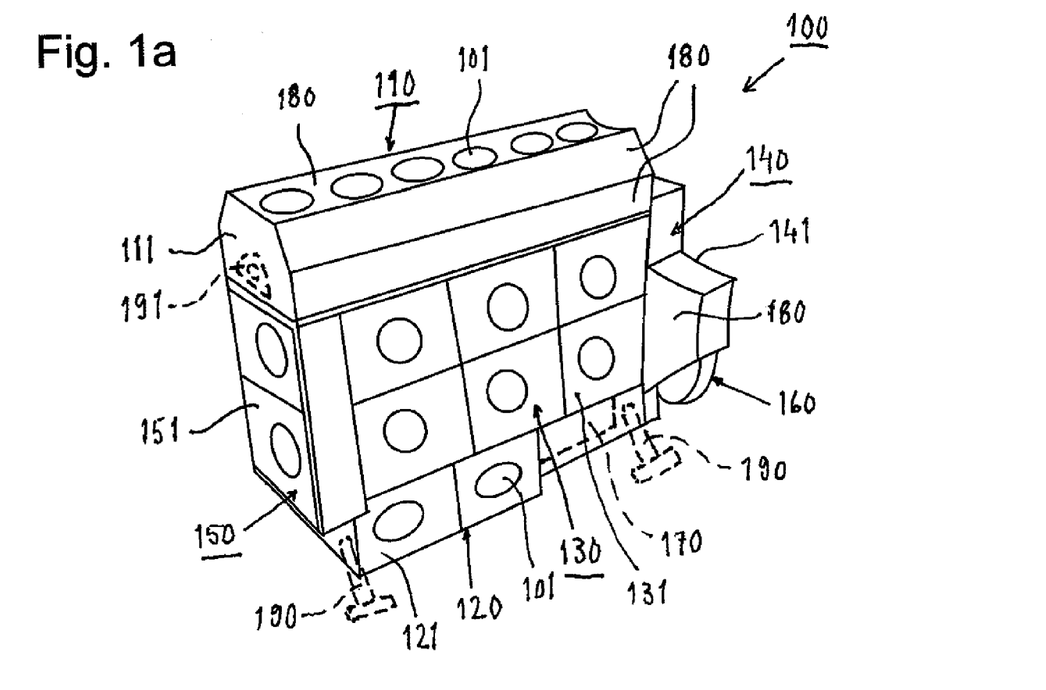
Figure 1B:
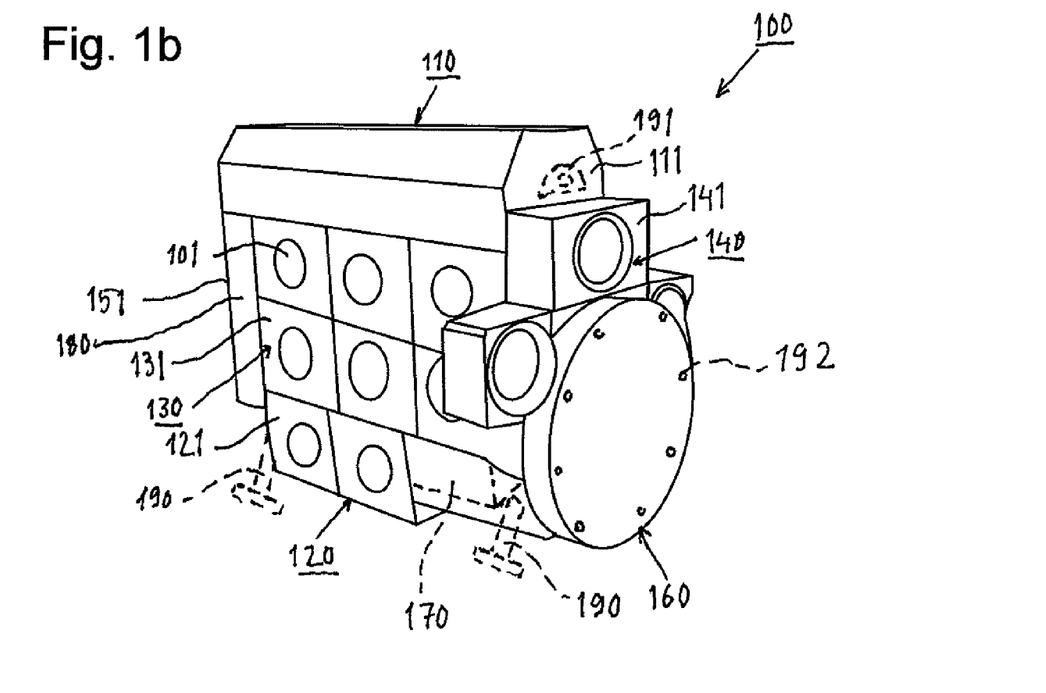

In FIGS. 1a and b a loudspeaker configuration according to one embodiment of a loudspeaker configuration according to the present invention is designated by 100. As will be discussed later the loudspeaker configuration comprises a number of loudspeaker units 101, preferably applied to a skeleton 200, FIG. 2.

A loudspeaker configuration according to the present invention is arranged for providing an acoustic emission profile of a desired engine configuration. According to one embodiment the preferred engine configuration is an internal combustion engine for a heavy vehicle, e.g. a truck or a bus.

Thus, according to preferred embodiments, a loudspeaker configuration according to the present invention is provided with loudspeaker units configured to simulate the way at least the most significant acoustic emission sources of a real desired engine to be investigated are mutually configured.

According to the exemplifying embodiment depicted in FIGS. 1a and 1b, a loudspeaker configuration according to the present invention is of a substantially parallelepipedic elongated configuration having an assembly 110, a row, of upwardly directed loudspeaker units 101 at a top portion 111 of the configuration 100, an assembly 120 of laterally directed loudspeaker units 101 on each side bottom portion 121, an assembly 130 of laterally directed loudspeaker units on each side portion 131, an assembly 140,150 of longitudinally directed loudspeaker units on each one of the rear and front sides 141,151, a substantially cylindrical portion 160 at the rear side 141 and an assembly 170 of downwardly directed loudspeakers at the, preferably longitudinal and central, bottom portion, all seen in an as installed state of a corresponding real engine.

In such an exemplifying embodiment the assembly 110 is intended to correspond to the engine cylinder arrangement with fuel injection, combustion etc and the acoustic emission therefrom, the assembly 120 to the oil trough and the acoustic emission therefrom, the assemblies 130 to the engine block and the acoustic emission therefrom, the assembly 150 in the front to belt drive arrangements and the acoustic emission therefrom and the assembly 140 in the rear to the engine transmission portion and the acoustic emission therefrom and the assembly 170 to the bottom portion of the oil trough, the oil trough being an important emission source due to the non-rigidity and the position close to the ground of the oil trough.

Figure 2:
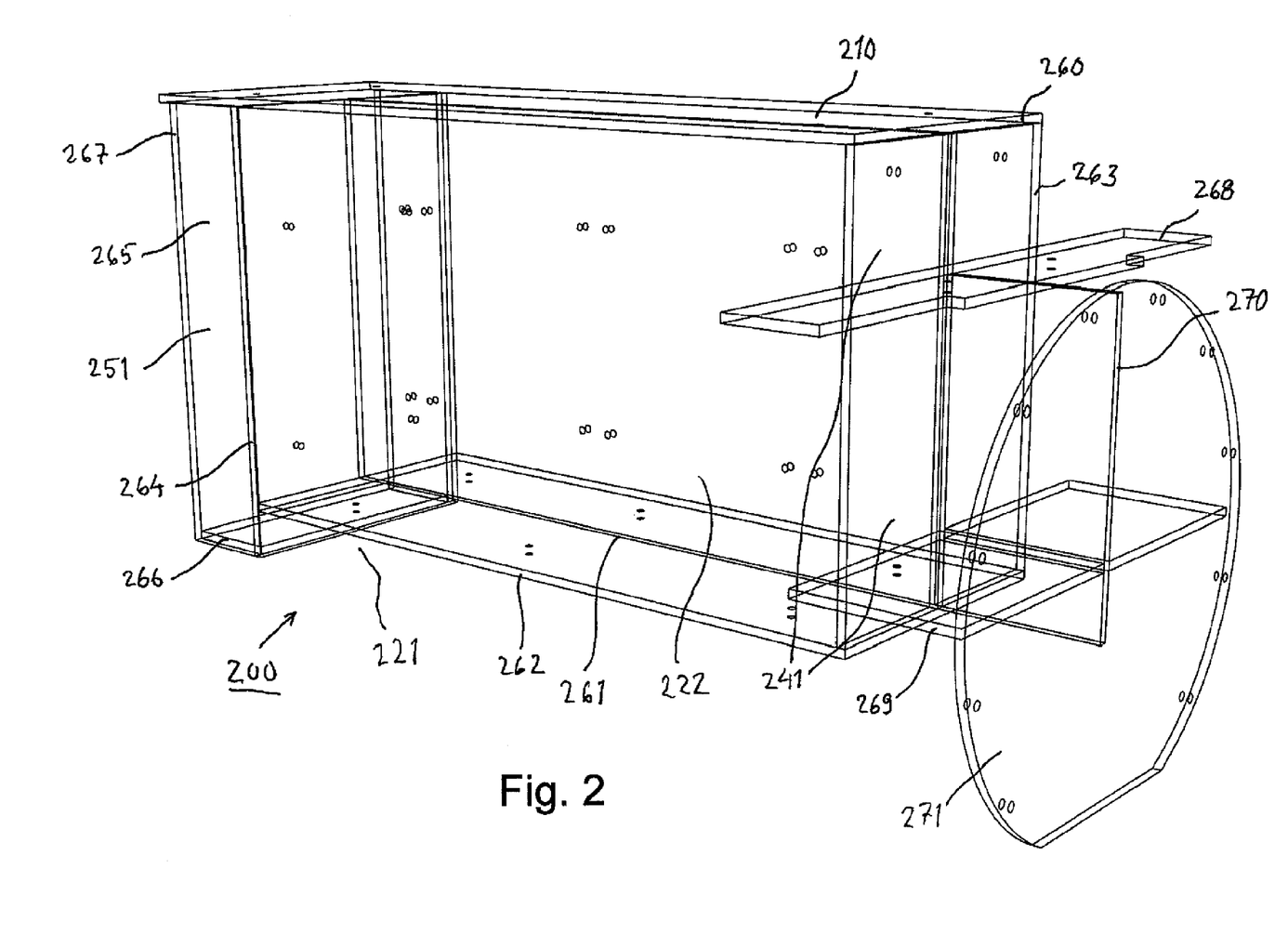

According to a preferred embodiment of the present invention a skeleton 200 or support framework 200 for loudspeaker configurations is provided, said skeleton being arranged to receive and support loud speakers in one or more desired configurations. Especially, the skeleton is arranged to receive the different assemblies of loudspeakers and to provide the desired mutual positioning of the desired assemblies. Thus, according to the embodiment shown, which is shown with all lines as continuous lines in order to more clearly show the skeleton arrangement, an upper support 210 is provided for the assembly 110, a support space 221 on each side bottom portion 121, a support space 222 on each side portion 122 for the assemblies 130, a support space 241 and a support space 251 for the assemblies 140, 150, respectively, on the rear and front sides 141 and 151, respectively, all seen in the as installed state of a corresponding real engine.

According to the embodiment illustrated, the skeleton comprises a top wall 260, a central longitudinally running wall 261, a bottom wall 262, a rear gable portion 263, a front gable portion 264, a frontwardly open boxlike space 265 of horizontal 266 and vertical 267 wall portions, two horizontal shelf portions, an upper 268 and a lower 269, a longitudinal, vertical and central support wall 270, arranged between said shelf portions, and a substantially circular front piece 271 arranged vertically and extending laterally in relation to the support wall 270 on each side of the wall 270.

In FIGS. 1a and 1b the loudspeakers are schematically shown as boxes, each having a circle corresponding to the periphery of the loudspeaker membrane.

Figure 1C:
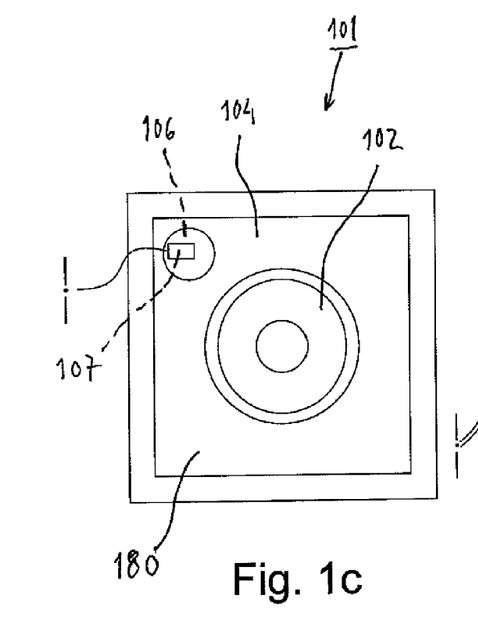
Figure 1D:
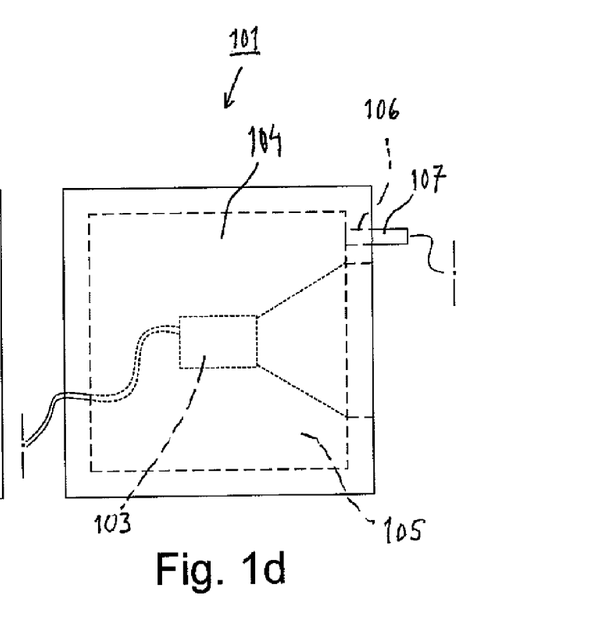

In more detail, FIGS. 1c and d, each loudspeaker unit 101 with membrane 102, signal receiving components 103 etc is provided in an hermetic, air tight, box 104 providing a closed cavity 105, a recess 106 for a microphone 107 being provided, so that a volume flow created by the loudspeaker may be measured for calibration of the loudspeaker.

Thus, according to the present invention, the loudspeaker configuration is intended and arranged to, also geometrically, simulate the engine to be studied, the engine providing the boundary conditions for the acoustic emissions and the loudspeaker configuration being intended to be controlled to provide the boundary conditions of the engine to be studied.

Therefore, preferably all surfaces of the loudspeaker configuration should be arranged to be able to participate in the acoustic emission as the real engine does, the loudspeaker membranes 102 and the cover surfaces 180 of the loudspeaker configuration participating in the emission as parts of the boundary surface of the loudspeaker configuration.

For the same reason, i.e. to simulate the real engine to be investigated, the loudspeaker configuration is intended to be installed in a vehicle as a substitute for the real engine. Therefore, the loudspeaker configuration is provided with ordinary engine fastening means 190, legs, as schematically shown in FIG. 1a and b, and preferably also lifting ears 191. Further, the cylindrical portion 160 corresponding to the transmission fastening portion of a real engine, is preferably provided with a set of bolt holes 192 having the same distribution as that of a real engine, so that the loudspeaker configuration may be connected to a real vehicle transmission.

According to one principal embodiment of the method according to the present invention the following principal steps of engine and vehicle acoustic emission research and investigation are performed:
  identifying the desired real engine configuration and
    recording from said engine configuration the acoustic emission, preferably in detail, by means of a number of microphones distributed in association with the acoustic emission sources of the engine configuration;
  choosing and providing a loudspeaker configuration for simulation of said engine configuration with respect to acoustic emission;
  calibrating the loudspeaker configuration against the recorded real engine acoustic emissions by means of microphones applied to the loudspeaker configuration loudspeaker units,
  applying the loudspeaker configuration in the intended vehicle as a real engine;
  generating desired acoustic emissions by the loudspeaker configuration; and
  detecting acoustic emissions at desired locations.

Figure 3A:
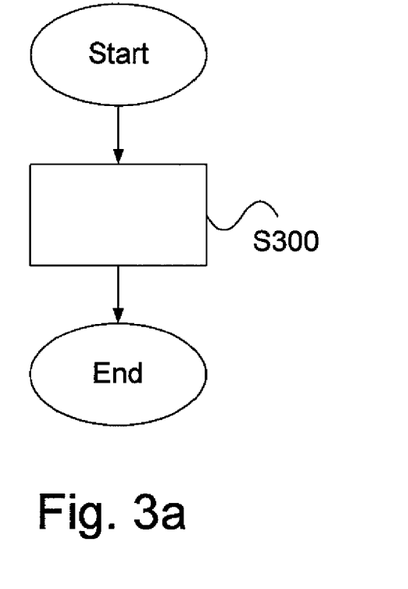

FIG. 3a schematically illustrates steps of a method according to one general embodiment of the present invention.
  A first step S300 comprises
    choosing and providing a loudspeaker configuration adapted to the engine configuration to be simulated and investigated with respect to acoustic emission, and
    generating desired acoustic emission profiles.
  When step S300 is performed the method ends.

Figure 3B:
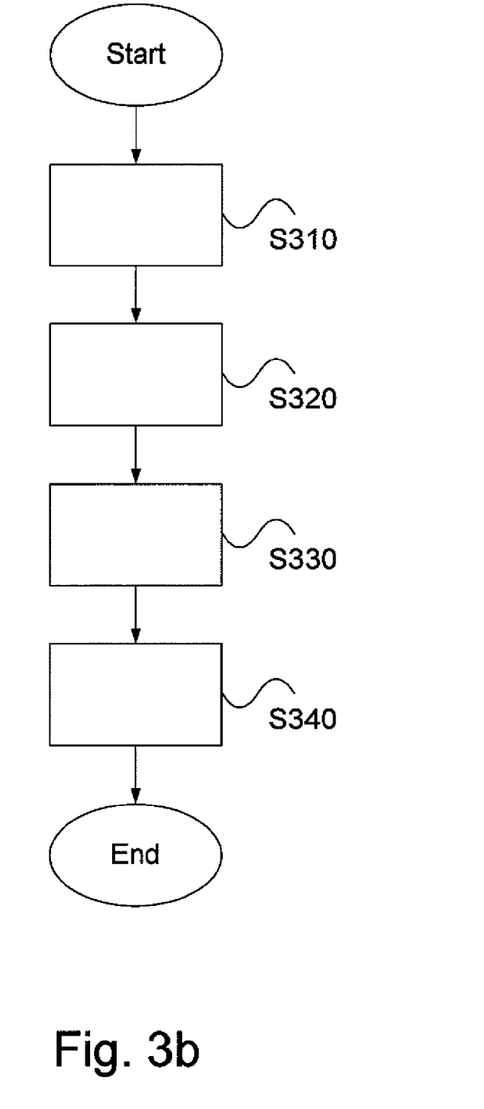

FIG. 3b schematically illustrates one embodiment of a method according to the present invention for generating desired engine acoustic emission in more detail.
  The method comprises a first method step 310. The method step 310 comprises the step of
    choosing a loudspeaker configuration.
  After step 310 a subsequent method step 320 is performed.
  The method step 320 comprises the step of
    choosing a kind of acoustic emission to be utilized, i.e., recorded or artificially generated or a combination thereof, by the chosen loudspeaker configuration.
  After the method step 320 a subsequent method step 330 is performed.
  The method step 330 comprises the step of
    choosing desired engine operational conditions.
  After method step 330 a subsequent method step 340 is performed.
  The method step 340 comprises the steps of
    generating signals S1, . . . , Sn to be fed to the loudspeakers of the chosen loudspeaker configuration in accordance with the chosen engine operational conditions and feeding the signals to the loudspeakers.

After method step 340 the method ends.

Figure 4:
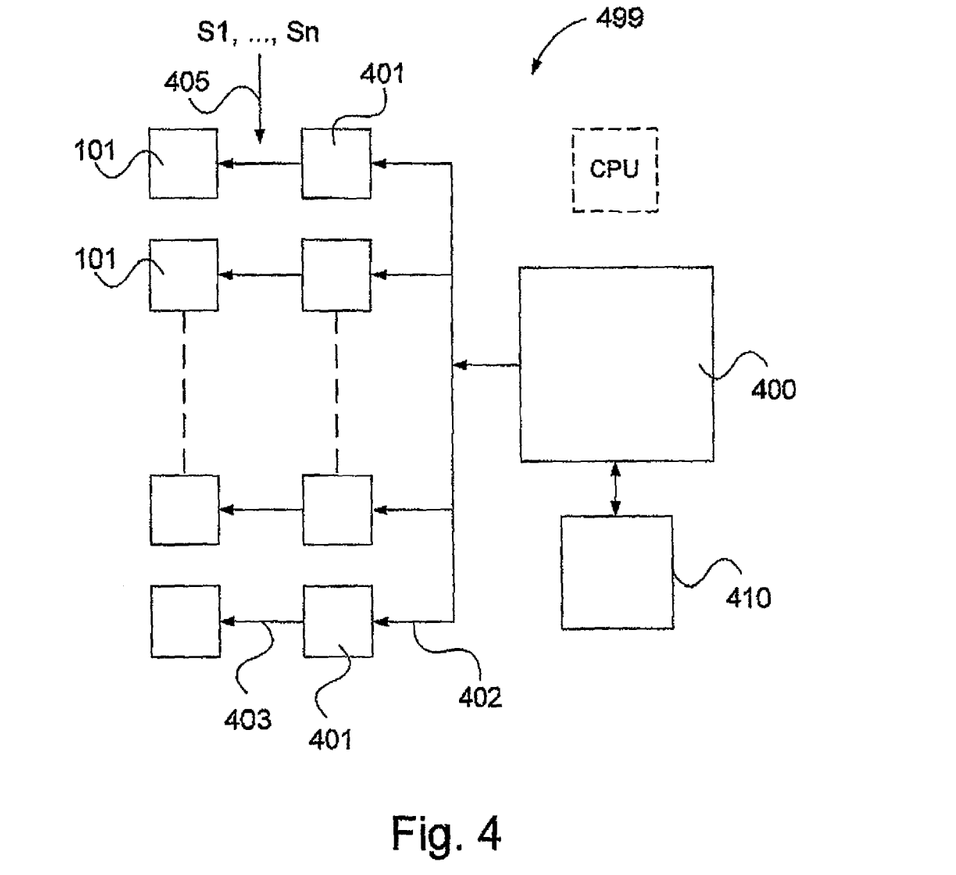

As shown in FIG. 4, according to one embodiment of a device according to the present invention, a subsystem 499 is provided as part of the device.

Hereinafter the term "link" refers to a communication link which may be a physical connector, such as an optoelectronic communication wire, or a non-physical connector, such as a wireless connection, eg a radio or microwave link.

The subsystem comprises a data processing unit 400 arranged to control signal generating means 401 arranged for generating and feeding signals S1, . . . , Sn to the loudspeaker configuration in order to generate acoustic emissions and, thus, provide an acoustic emission profile corresponding to a desired engine acoustic emission profile. According to the embodiment shown links 402 are provided for controlling the signal generating means 401 and links 403 for feeding signals to the loudspeaker units 101 or assemblies of loudspeaker units, such assemblies being discussed above. The signals Si, Sn transferred by the links 403 are schematically illustrated by an arrow 405 in FIG. 4. According to one embodiment an extra data processing unit 410 is provided and may be arranged to perform substantially the same functions as the unit 400.

According to one embodiment of the present invention the loudspeaker configuration is fed with signals S based upon recorded acoustic emissions of a real engine to be considered.

According to one embodiment of the present invention the loudspeaker configuration is fed with signals S based upon artificially generated acoustic emissions.

According to one embodiment of the present invention the loudspeakers are fed with signals S based upon a combination of recorded and artificially generated acoustic emissions.

Figure 5:
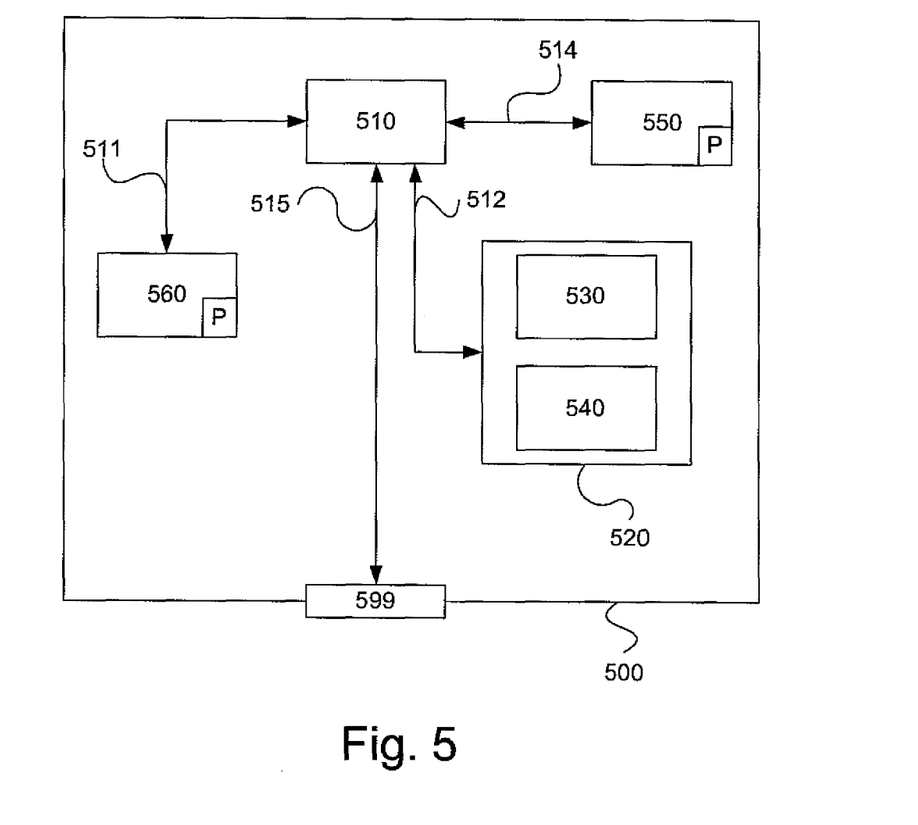

With reference to FIG. 5 a diagram of one embodiment of an apparatus 500 is shown. The data processing unit 400 depicted in FIG. 4 may comprise the apparatus 500. The apparatus 500 comprises a non-volatile memory 520, a data processing device 510 and a read/write memory 550. The non-volatile memory 520 has a first memory portion 530 wherein a computer program, such as an operating system, is stored for controlling the function of the apparatus 500. Further, the apparatus 500 comprises a bus controller, a serial communication port, I/O means, an A/D-converter, a time date entry and transmission unit, an event counter and an interrupt controller (not shown). The non-volatile memory also has a second memory portion 540.

Data processing device 510 may communicate with a data port 599 by means of a data bus 515. Non-volatile memory 520 is adapted for communication with data processing device 510 via a data bus 512. Separate memory 560 is adapted to communicate with data processing device 510 via data bus 511. Read/write memory 550 is adapted to communicate with data processing device 510 via data bus 514.

When data is received on data port 599 it is temporarily stored in second memory portion 540. When the received input data has been temporarily stored, data processing device 510 is set up to perform execution of code in a manner described above. According to one embodiment, data received on data port 599 may comprise information regarding desired loudspeaker configuration, kind of acoustic emission, i.e. recorded and/or artificially generated emissions, and desired engine operational configuration including desired engine type and specific engine configuration. According to preferred embodiments desired engine type and engine configuration as well as engine operational configuration is provided by a general overall control system, CPU, of a vehicle, in which the engine is intended to be installed. Said information, all or a portion of it, can be used by apparatus 500 so as to generate the desired acoustic emissions.

A computer program P is provided comprising routines for receiving information regarding desired engine operational conditions. The program P further comprises routines for controlling the signal generating means 401 for generating and feeding signals S1, . . . , Sn to the loudspeaker configuration in accordance with the desired engine operational conditions. The information to be received by the program P regarding desired engine operational conditions may comprise information regarding if the signals to be fed to the loudspeaker configuration should be based upon recorded acoustic emissions or upon artificially generated acoustic emissions or combinations thereof. The program P also comprises routines for receiving information regarding desired loudspeaker configuration so that specific loudspeaker configurations can be chosen, including configurations including one or more loudspeakers 101. Specifically, such specific loudspeaker configurations may include one or more loudspeaker assemblies 110, 120, 130, 140, 150 representing certain technical engine functions as described earlier, so that certain engine function acoustic emissions may be isolated. The program P may be stored in an executable manner or in a compressed state in a separate memory 560 and/or in a read/write memory 550.

When it is stated that the data processing device 510 performs a certain function it should be understood that the data processing device 510 performs a certain part of the program P, which is stored in the separate memory 560 or a certain part of the program P, which is stored in the read/write memory 550.

Parts of the methods described herein can be performed by apparatus 500 by means of data processing device 510 running the program stored in separate memory 560 or read/write memory 550. When apparatus 500 runs the program, parts of the methods described herein are executed.

An aspect of the invention relates to a computer program comprising a program code for performing the method steps depicted with reference to FIGS. 3a and 3b, respectively, when the computer program is run on a computer.

An aspect of the invention relates to a computer program product comprising a program code stored on computer-readable media for performing the method steps depicted with reference to FIGS. 3a and 3b, respectively, when the computer program is run on the computer.

An aspect of the invention relates to a computer program product directly storable in an internal memory of a computer, comprising a computer program for performing the method steps depicted with reference to FIGS. 3a and 3b, respectively, when the computer program is run on the computer.

The method as well as the function of the device according to the present invention should to a considerable and sufficient extent have been made clear by the detailed description given above.

Thus, according to the embodiments shown and discussed, based upon engine characteristica in the form of engine type, engine installation configuration etc, a loudspeaker configuration is chosen and provided, preferably by means of a loudspeaker configuration skeleton or support framework 200. Information regarding desired operational conditions etc is provided for and received by the data processing unit 400 of the subsystem 499 and signals S are generated and fed to the loudspeakers for generation of the desired acoustic emission.

The desired acoustic emissions may be for the entire engine, for one or more of the specific engine technical functions, eg the cylinders with fuel injection, isolated or in desired combinations.

For vehicle investigation purposes, the loudspeaker configuration is introduced into the vehicle.

Generated acoustic emissions are detected by means of microphone configurations adapted to the actual investigations for feed-back, documentation etc.

The method and the device according to the present invention offers extremely flexible and easy to perform possibilities to investigate and control engine acoustic emissions compared to prior art techniques.

By means of the loudspeaker configuration skeleton or support framework 200 a high configuration flexibility is obtained, the mutual positioning with respect to single loudspeakers as well as loudspeaker assemblies is obtained, an easy to perform exchange of one or more loudspeakers also being provided.

Above the invention has been described in association with preferred embodiments and examples.

Of course further embodiments as well as minor additions and amendments may be imagined without departing from the basic inventive idea.

According to one embodiment the membrane of the loudspeaker units are arranged to be blocked, so that a blocked loudspeaker unit does not interfere with any other loudspeaker unit or units, such as neighbouring units.

Further, as may be concluded from the above description, each loudspeaker unit is preferably separately fed with signals S, so that e.g. neighboring units may be fed in phase or mutually in counterphase in order to create different desired acoustic emissions.

Thus, the present invention should not be considered limited to the embodiments and examples shown but may be varied within the scope of the appended claims.

The invention claimed is:

1. A method for generating and/or studying acoustic emissions based on identified engine acoustic emissions produced by a real engine configuration including a first engine part, and a second engine part arranged in a first spatial relation to the first engine part, the engine acoustic emissions having boundary conditions, the method comprising:
providing a loudspeaker configuration comprising a first speaker unit and a second speaker unit, the first speaker unit configured to simulate the first engine part, the second speaker unit configured to simulate the second engine part and positioned in the first spatial relation to the first speaker unit so as to simulate the identified real engine configuration provided boundary conditions, and controlling the loudspeaker configuration to simulate the boundary conditions of the real engine configuration;
feeding the loudspeaker configuration with signals for providing the acoustic emissions so as to simulate the engine acoustic emissions.

2. A method according to claim 1, further comprising the step of:
introducing the loudspeaker configuration in a vehicle as an alternative to the real engine configuration so as to simulate the acoustic emission.

3. A method according to claim 1, the method further comprising the steps of:
recording from the real engine configuration the acoustic emissions by applying first microphones to the loudspeaker units of the loudspeaker configuration; and
calibrating the loudspeaker configuration against recorded engine acoustic emissions from the real engine configuration by applying second microphones to the loudspeaker units of the loudspeaker configuration.

4. A method according to claim 1, wherein the loudspeaker configuration has loudspeaker units corresponding, respectively, to at least most of the significant acoustic emission sources of the engine configuration.

5. A method according to claim 1,
the method further comprising the step of:
providing the loudspeaker configuration as a skeleton or support framework for mounting of selected ones of loudspeaker units of the loudspeaker configuration.

6. A method according to claim 1, further comprising the step of:
feeding signals to the loudspeaker configuration based upon recorded acoustic emissions of the real engine as the desired acoustic emissions.

7. A method according to claim 1, further comprising the step of:
feeding signals to the loudspeaker configuration based upon artificially generated acoustic emissions as the desired acoustic emissions.

8. A method according to claim 1, further comprising the step of:
operating a data processing unit for controlling signal generation and feeding signals to the loudspeaker configuration in accordance with the desired engine acoustic emissions.

9. A method according to claim 1, further comprising the steps of:
providing loudspeaker units of the loudspeaker configuration in assemblies, wherein each assembly comprises one or more loudspeaker units and each assembly represents at least one engine component; and
isolating the at least one engine component acoustic emissions for separate simulation of acoustic emission.

10. A method according to claim 1 further comprising the step of:
detecting acoustic emissions from the loudspeaker configuration and the vehicle by applying microphones at selected locations for investigating acoustic transmission in the vehicle.

11. A method according to claim 1, wherein the engine is an internal combustion engine for a heavy vehicle.

12. A device for generating and/or studying acoustic emission from an engine having an engine configuration with a first engine part and a second engine part arranged in a first spatial relation to the first engine part, the device comprising:
a loudspeaker configuration arranged and configured based on the engine configuration, the engine configuration providing boundary conditions for the loudspeaker configuration, the loudspeaker configuration producing acoustic emissions so as to simulate the engine configuration boundary conditions of the acoustic emissions of the engine; and
the loudspeaker configuration comprising a first speaker unit configured to simulate the first engine part, and a second speaker unit configured to simulate the second engine part and positioned in the first spatial relation to the first speaker;
a control unit configured to control the acoustic emissions so as to provide boundary conditions of the engine, and to feed the loudspeaker configuration with signals for providing the desired acoustic emissions.

13. A device according to claim 12, wherein the loudspeaker configuration is configured to be introduced in a vehicle as an alternative to the real engine for acoustic emission simulation.

14. A device according to claim 12, further comprising units configured to record the acoustic emissions from the real engine configuration, the units including first microphones distributed in association with the acoustic emission sources of the engine configuration; and
   second microphones applied to the loudspeaker units of the loudspeaker configuration and configured to calibrate the loudspeaker configuration against the recorded engine acoustic emissions.

15. A device according to claim 12, wherein the loudspeaker configuration comprises loudspeaker units configured to correspond to a way that at least the most significant acoustic emission sources of the engine are located and mutually configured.

16. A device according to claim 15, wherein the engine is an internal combustion engine, and the most significant acoustic emission sources include a cylinder arrangement for the combustion engine, a camshaft with drive arrangement and an oil trough of the engine.

17. A device according to claim 12, wherein the loudspeaker configuration comprises a skeleton or support framework arranged for mounting of loudspeaker units of the loudspeaker configuration.

18. A device according to claim 12, wherein the engine and the device are configured such that signals fed to the loudspeaker configuration are based upon recorded acoustic emissions of a selected real engine.

19. A device according to claim 12, wherein the engine and the device are configured such that signals fed to the loudspeaker configuration are based upon artificially generated acoustic emissions.

20. A device according to claim 12, wherein each loudspeaker unit comprises:
   a hermetic box for a loudspeaker membrane,
   a microphone recess, and
   a microphone in the recess for measuring acoustic emission volume flow in the box for calibration.

21. A device according to claim 12, wherein the loudspeaker configuration is of a substantially parallelepipedic elongated configuration comprising:
   an assembly in a row of upwardly directed loudspeaker units at a top portion of the configuration,
   an assembly of laterally directed loudspeaker units on each side bottom portion of the configuration,
   an assembly of laterally directed loudspeaker units on each side portion of the configuration, and
   an assembly of longitudinally directed loudspeaker units on each of a rear side and a front side of the configuration.

22. A device according to claim 17, wherein the skeleton comprises:
   a top wall,
   a central longitudinally running wall,
   a bottom wall,
   a rear gable portion,
   a front gable portion,
   a frontwardly open boxlike space of horizontal and vertical wall portions,
   two horizontal shelf portions,
   an upper and a lower, a longitudinal, vertical and central support wall, arranged between the shelf portions, and
   a substantially circular front piece arranged vertically and extending laterally in relation to the support wall on each side of the support wall.

23. A device according to claim 19, wherein the loudspeaker configuration comprises fastening elements corresponding to fastening elements of the real engine and configured to fasten the loudspeaker configuration in a vehicle.

24. A device according to claims 12, further comprising a data processing unit for controlling signal generation and feeding of the loudspeaker configuration with signals in accordance with the desired engine acoustic emissions.

25. A non-transitory computer-readable medium incorporating program code configured to perform the method steps according to claim 1, when the program code is run on a computer.

26. A vehicle including the device of claim 13.

* * * * *